US011255515B2

(12) United States Patent
Daly

(10) Patent No.: US 11,255,515 B2
(45) Date of Patent: Feb. 22, 2022

(54) FOLDABLE LIGHT FIXTURE FOR INDOOR HORTICULTURE

(71) Applicant: Mammoth Lighting LLC, Saratoga Springs, NY (US)

(72) Inventor: Ryan Daly, Saratoga Springs, NY (US)

(73) Assignee: MAMMOTH LIGHTING LLC, Saratoga Springs, NY (US)

( * ) Notice: Subject to any disclaimer, the term of this patent is extended or adjusted under 35 U.S.C. 154(b) by 0 days.

(21) Appl. No.: 16/838,309

(22) Filed: Apr. 2, 2020

(65) Prior Publication Data
US 2021/0310635 A1 Oct. 7, 2021

(51) Int. Cl.
| F21V 14/02 | (2006.01) |
| F21S 8/06 | (2006.01) |
| F21V 21/30 | (2006.01) |
| F21V 21/15 | (2006.01) |
| A01G 7/04 | (2006.01) |

(52) U.S. Cl.
CPC ............ *F21V 14/02* (2013.01); *A01G 7/045* (2013.01); *F21S 8/061* (2013.01); *F21V 21/15* (2013.01); *F21V 21/30* (2013.01)

(58) Field of Classification Search
CPC .......... F21V 14/02; F21V 21/15; F21V 21/30; F21S 8/061; A01G 7/045
See application file for complete search history.

(56) References Cited

U.S. PATENT DOCUMENTS

| 6,517,216 | B1* | 2/2003 | Cercone | F21S 8/026 |
| | | | | 362/220 |
| 7,726,840 | B2* | 6/2010 | Pearson | F21S 4/28 |
| | | | | 362/249.06 |
| 9,541,261 | B2 | 1/2017 | Klase | |
| 2014/0009940 | A1* | 1/2014 | Moore | F21V 21/22 |
| | | | | 362/249.07 |
| 2018/0087755 | A1* | 3/2018 | Yorio | A01G 9/26 |
| 2019/0323698 | A1* | 10/2019 | Nolle | F21S 6/005 |
| 2020/0041109 | A1* | 2/2020 | Van Der Schyf | H02G 3/20 |
| 2020/0300447 | A1* | 9/2020 | Luo | A01G 9/249 |

OTHER PUBLICATIONS

Gavita Pro 1700e LED; URL: https://gavita.com/retail/products/gavita-pro-line-led/gavita-pro-1700e-led-ml/; Jan. 1, 2020.
Luxx 645w LED Pro; URL: https://luxxlighting.com/645w-led-pro; Jan. 1, 2020.
SPYDR Series—Fluence By OSRAM, URL: https://fluence.science/products/spydr-series/; Jan. 1, 2020.

* cited by examiner

*Primary Examiner* — Anabel Ton
(74) *Attorney, Agent, or Firm* — Cantor Colburn LLP

(57) ABSTRACT

A light fixture for indoor growing of horticulture products includes oppositely arranged first and second support rails with light bars extending therebetween, a power driver disposed at an interior of the one of the support rails and coupled with the light bars to diver power thereto, and a rotation element which allows the light fixture to pivot between an extended position in which the first and second support rails each extend linearly and are arranged parallel to one another, and a folded position in which a first side of the light fixture is arranged atop a second side of the light fixture and first portions of the support rails contact and lie flat against opposite second portions of the support rails.

15 Claims, 9 Drawing Sheets

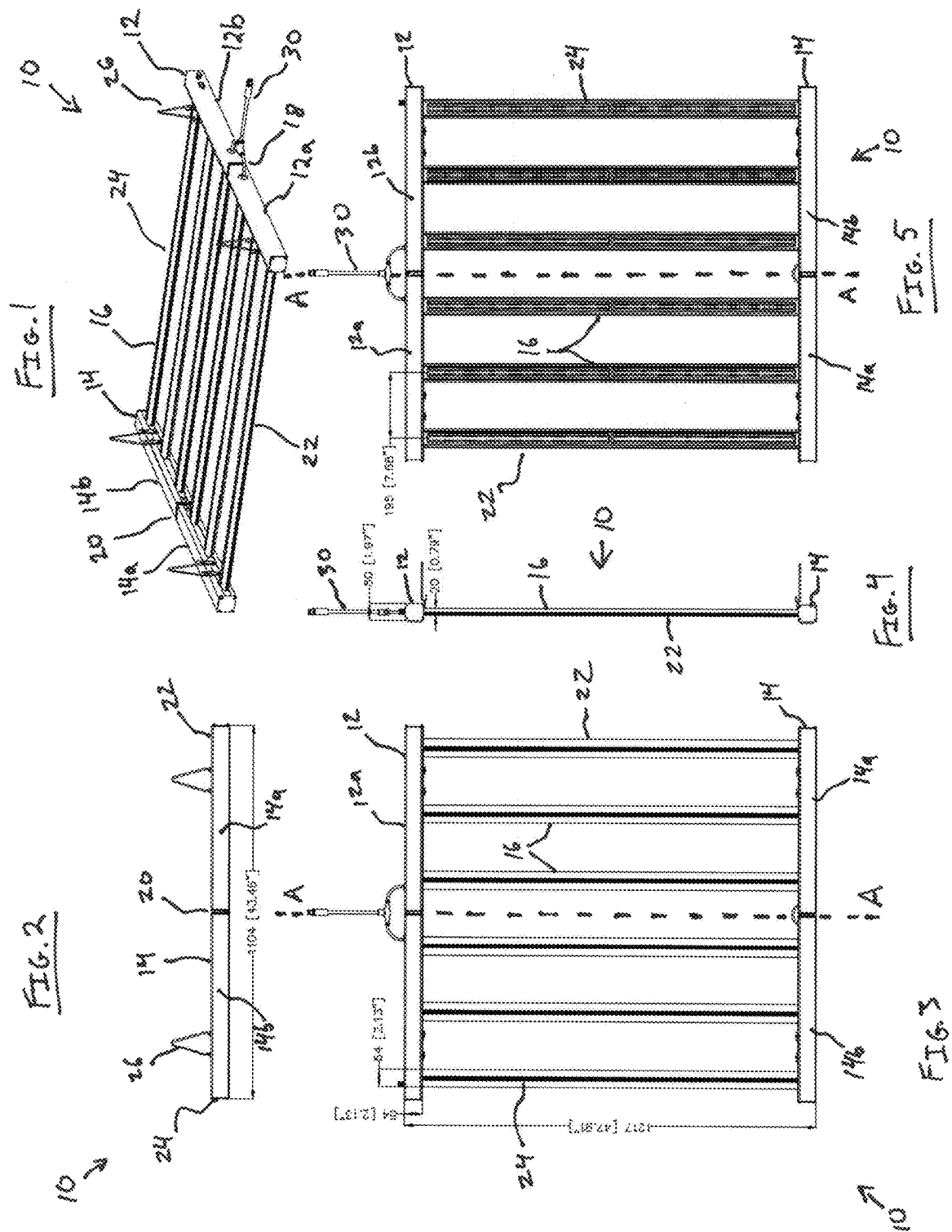

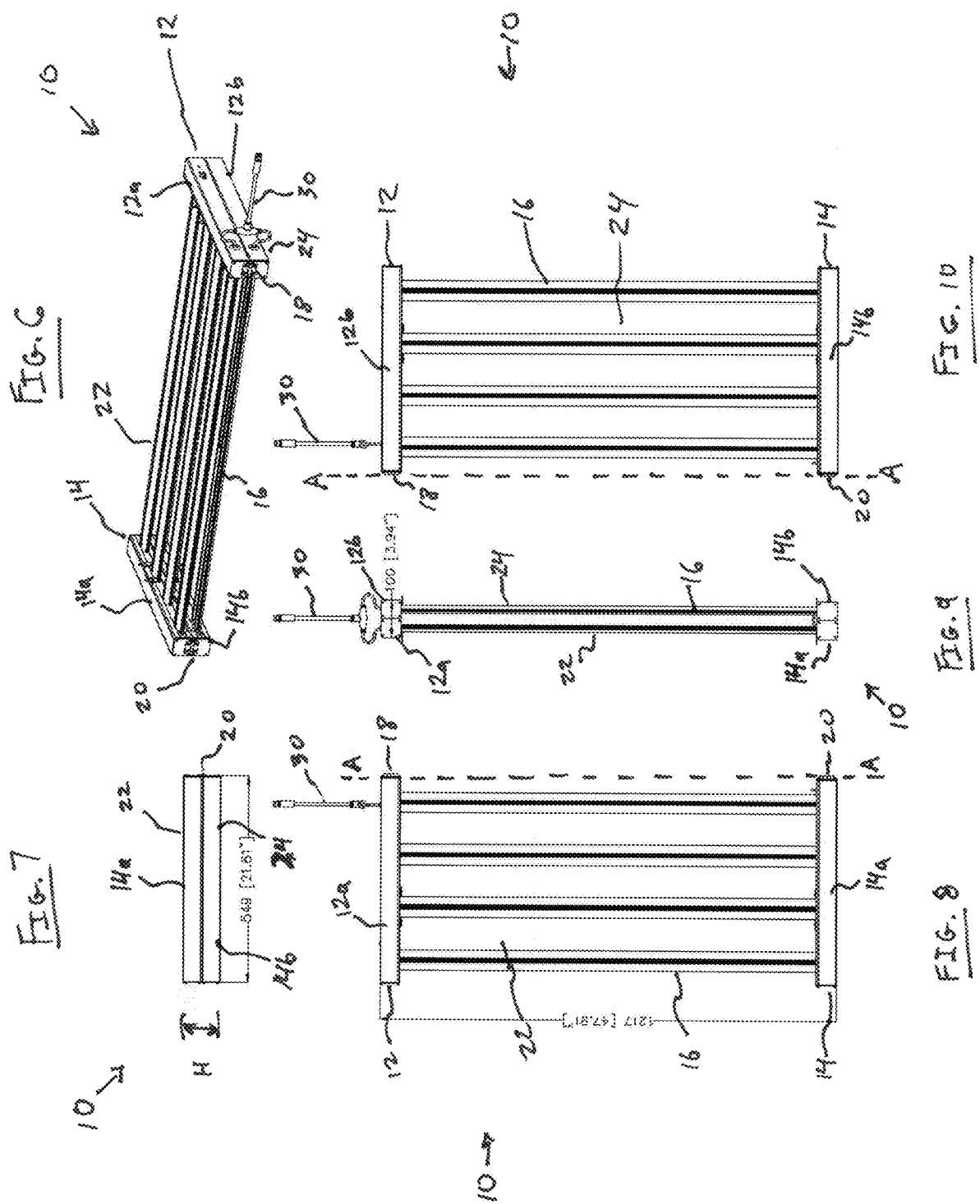

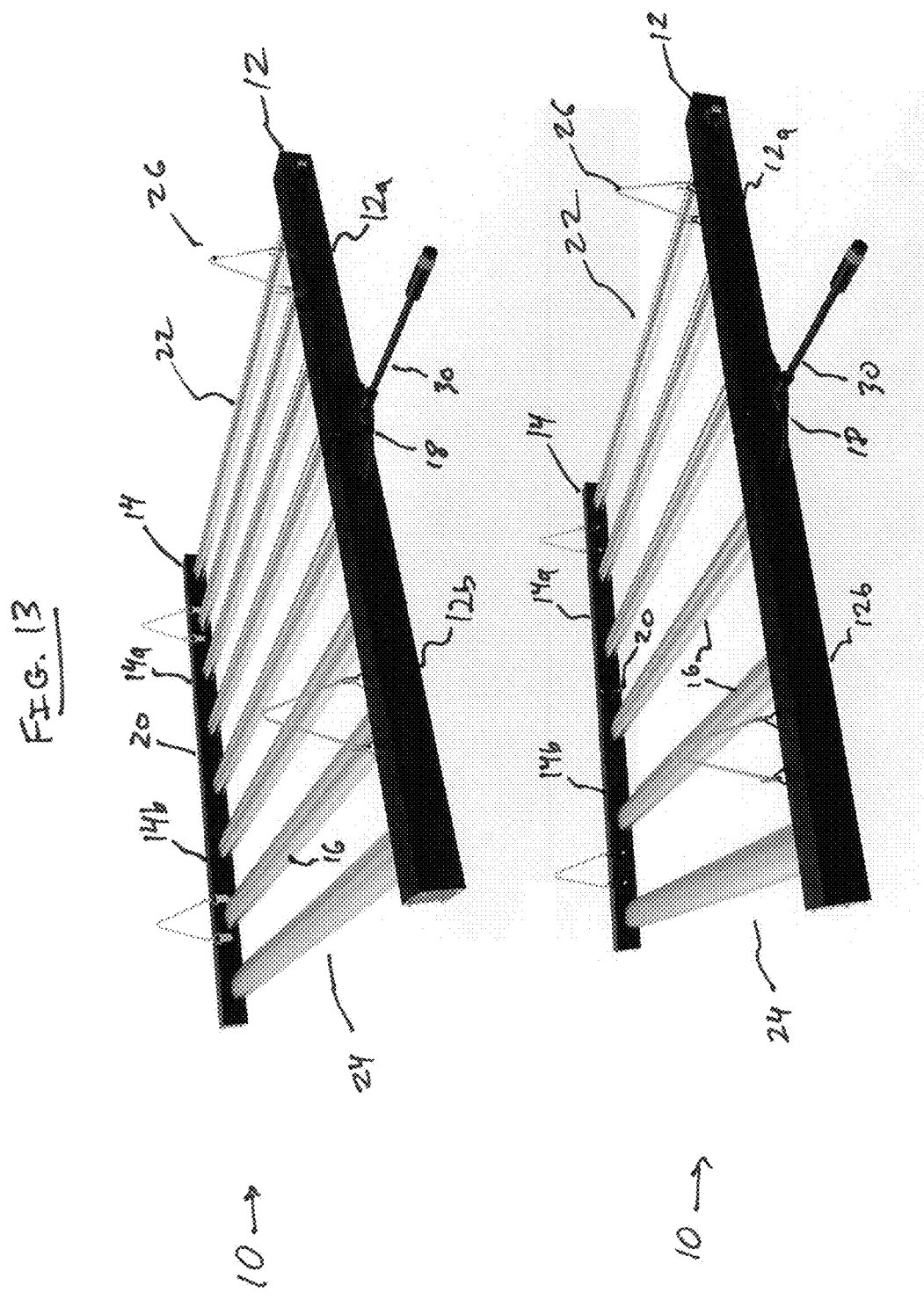

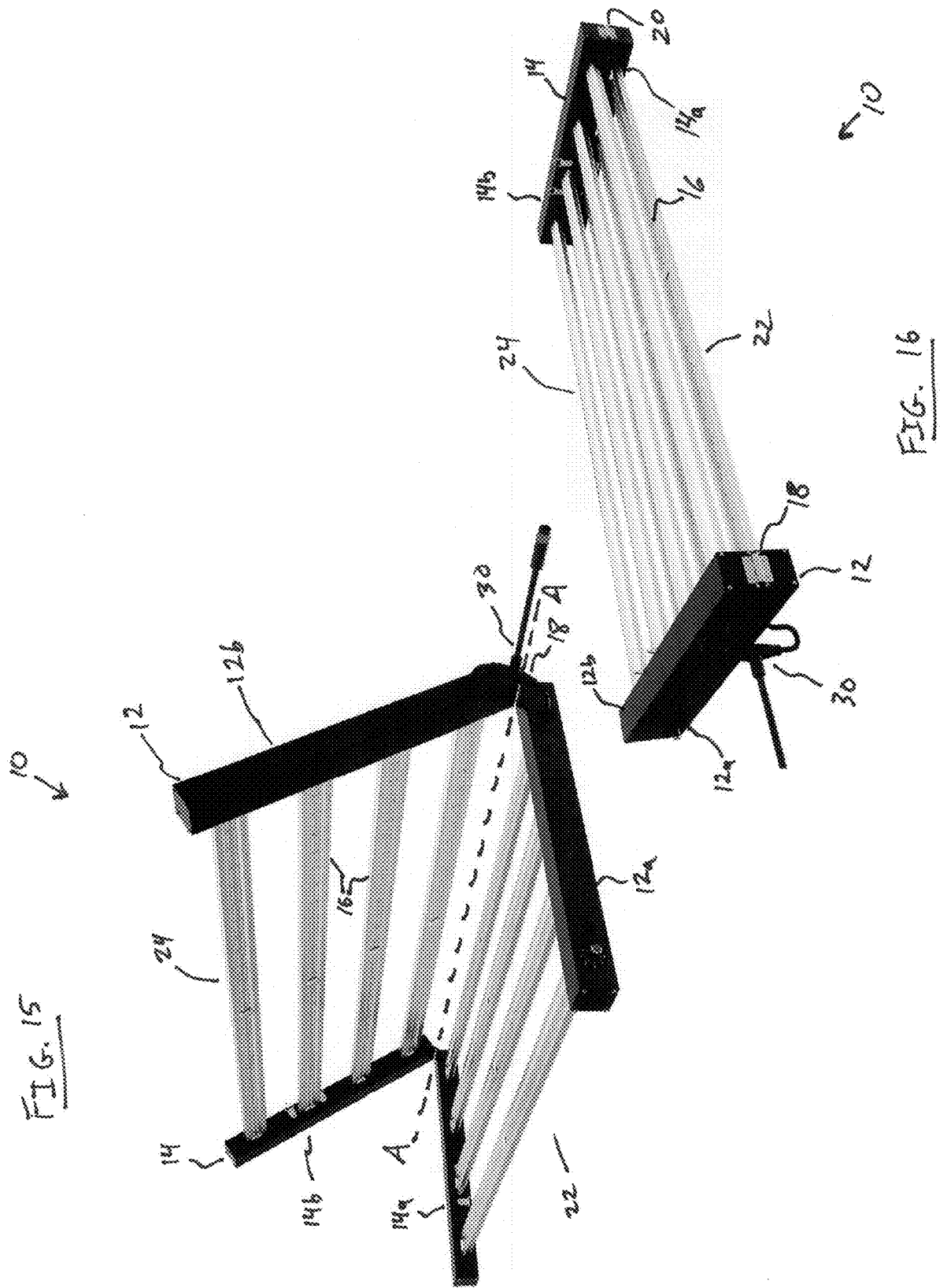

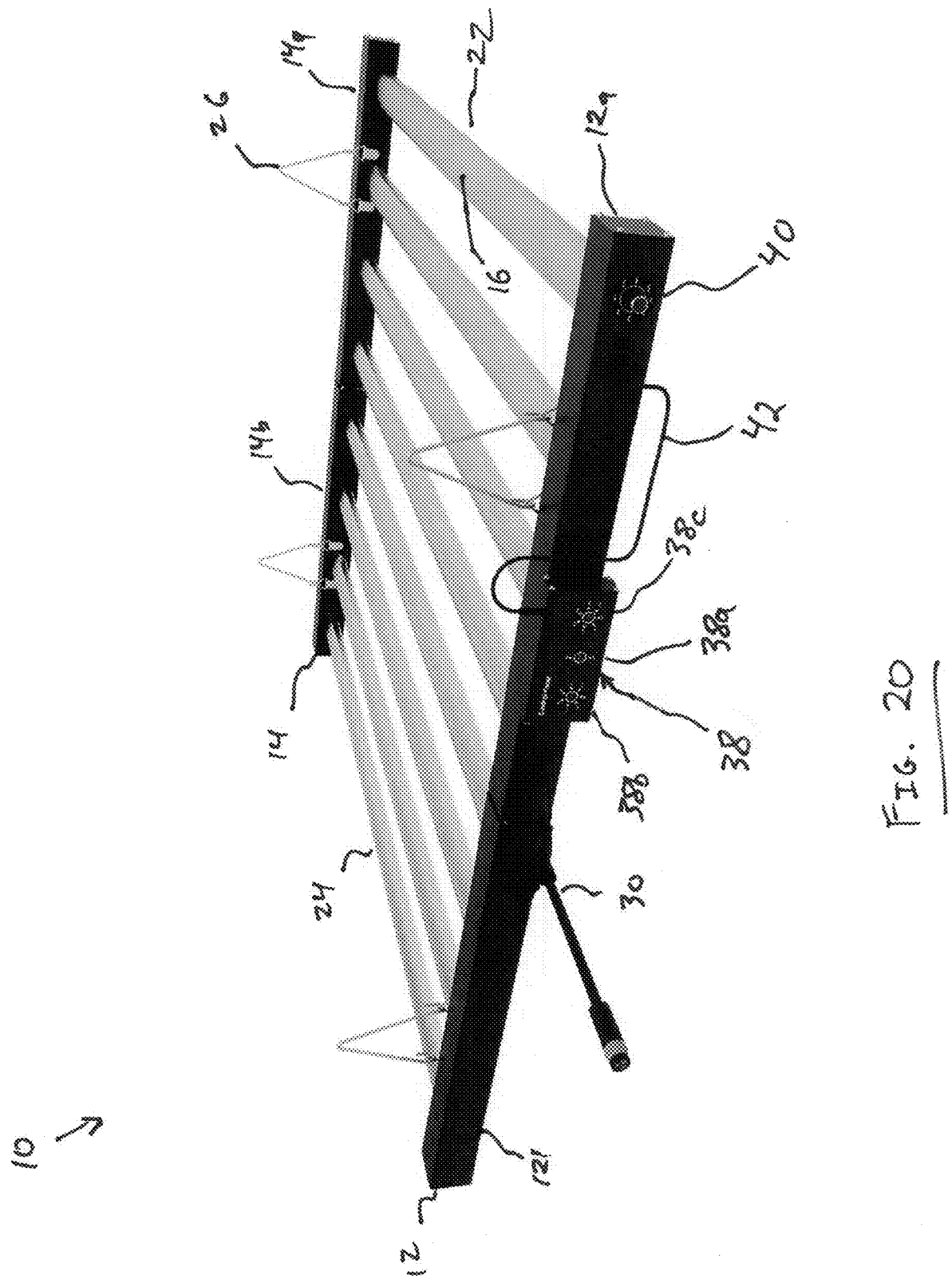

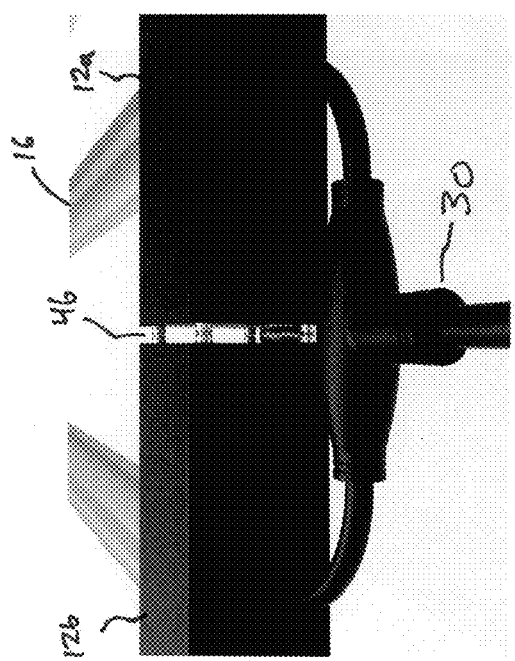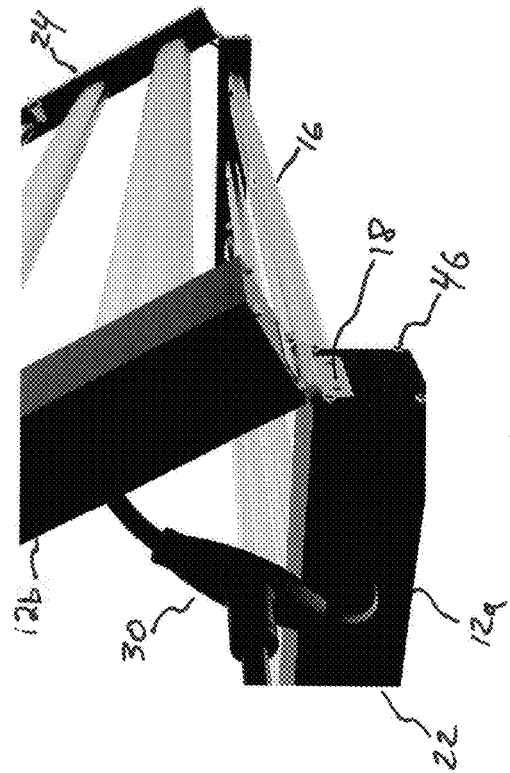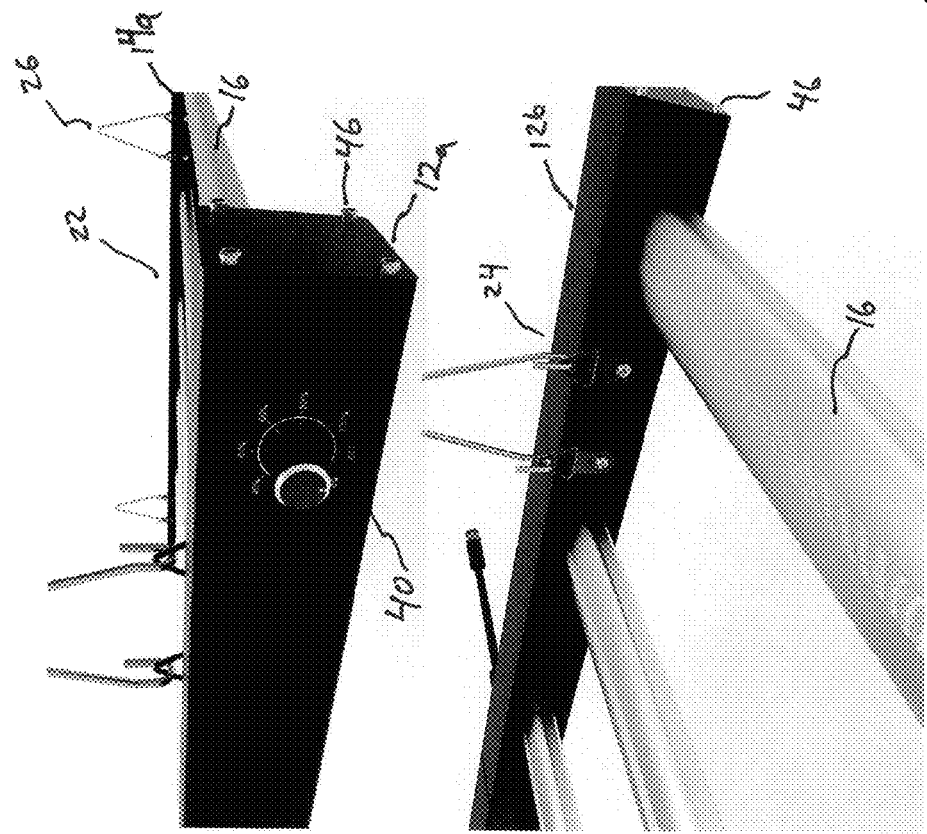

FOLDABLE LIGHT FIXTURE FOR INDOOR HORTICULTURE

TECHNICAL FIELD

The present disclosure relates to lighting and, more particularly, to a light fixture for indoor horticultural use that is foldable into a reduced size for easy storage and shipping, and which includes a reduced profile for facilitating mounting in an indoor setting.

BACKGROUND

The prevalence of indoor horticulture for hobbyists and professionals is on the rise. Specialized lighting is required to enable plant growth in indoor settings where natural light is insufficient or non-existent. Increasingly, horticulturalists are purchasing light fixtures online or via other remote means which require the fixtures to be delivered to the grow site. These specialized light arrays can be quite large in size and thus require significant delivery packaging which is labor and cost intensive to develop and to apply to a particular light fixture. Furthermore, due to the large and often unconventional size of such packages, additional shipping fees are often required. Some larger light fixtures can be shipped in sections, either together or separately, but assembly thereof by the end user is complicated and time consuming. Beyond shipping, conventional indoor horticultural lighting arrangements are difficult to maneuver and store due to their large and unwieldy size.

A light fixture is needed for indoor horticultural use that has a slim profile and which is capable of readily assuming a reduced footprint in order to facilitate shipping and storage, and to enable easy and advantageous mounting in an indoor setting.

BRIEF SUMMARY

The disclosure provides a light fixture for indoor growing of horticulture products that includes oppositely arranged first and second support rails with light bars extending therebetween, a power driver disposed at an interior of at least one of the support rails and coupled with the light bars to deliver power thereto, and a rotation element which allows the light fixture to pivot between an extended position in which the first and second support rails each extend linearly and are arranged parallel to one another, and a folded position in which a first side of the light fixture is arranged atop a second side of the light fixture and first portions of the support rails contact and lie flat against opposite second portions of the support rails.

More particularly, a light fixture is provided for indoor growing of horticulture products, including a first support rail, a second support rail arranged opposite from the first support rail, a plurality of light bars extending between the first and second support rails, a first rotation element disposed in the first support rail about which at least one of a first portion and a second portion of the first support rail is rotatable, a second rotation element disposed in the second support rail about which at least one of a first portion and a second portion of the second support rail is rotatable, a power driver disposed at an interior of at least one of the first or second portions of the first or second support rails, where the first and second rotation elements are arranged generally opposite from one another, where the first and second rotation elements delimit a first side of the light fixture including the first portion of the first support rail, the first portion of the second support rail, and the light bars extending therebetween, where the first and second rotation elements further delimit a second side of the light fixture including the second portion of the first support rail, the second portion of the second support rail, and the light bars extending therebetween, and where at least one of the first and second sides of the light fixture is rotatable about the first and second rotation elements to place the light fixture in a folded position where the first portions of the first and second support rails are adjacent to and parallel with the second portions of the first and second support rails, and an extended position where the first portions of the first and second support rails are colinear with the second portions of the first and second support rails.

BRIEF DESCRIPTION OF THE DRAWINGS

For a more complete understanding of this disclosure, reference is now made to the following brief description, taken in connection with the accompanying drawings and detailed description, wherein like reference numerals represent like parts, in which:

FIGS. 1-5 show various views of a light fixture in an extended position in one exemplary embodiment of the disclosure;

FIGS. 6-10 show various views thereof in a folded position;

FIG. 13-14 show top views thereof in the extended position;

FIGS. 15-16 show the light fixture in the folded position and in a partially folded position;

FIG. 19 is a partial exploded view of the light fixture;

FIG. 20 shows another top view of the light fixture in the extended position; and FIGS. 21-24 show enlarged partial views of the light fixture in the extended and partially folded positions.

DETAILED DESCRIPTION

Figure 12:
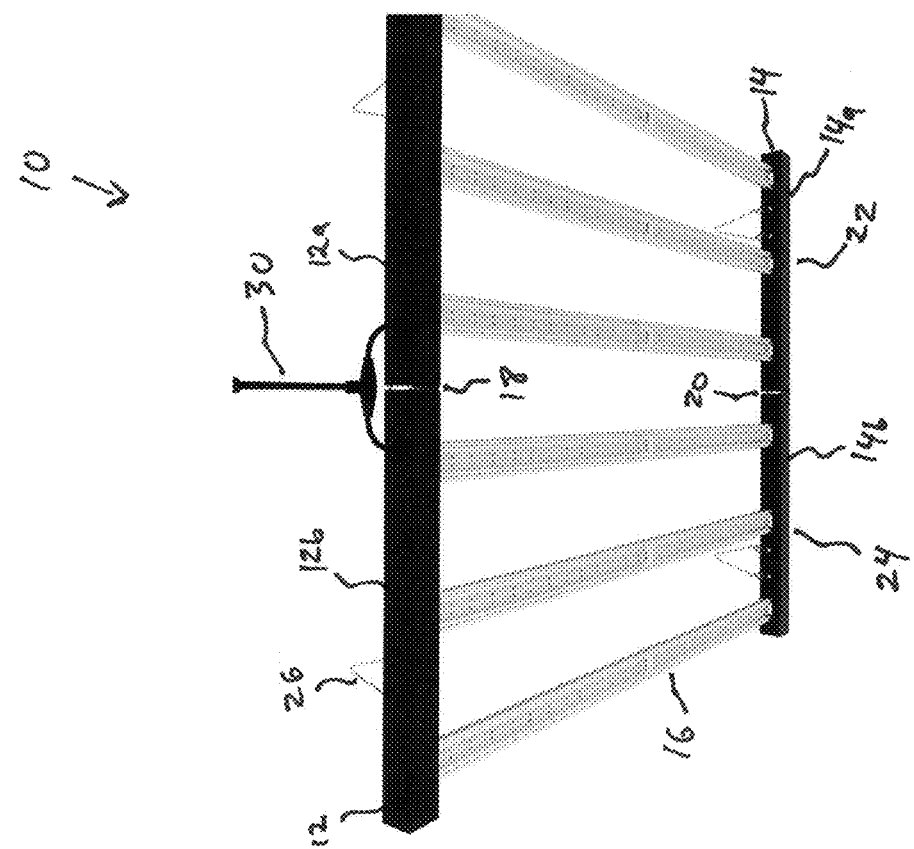
FIG. 11-12 show underside views thereof in the extended position.
Figure 11:
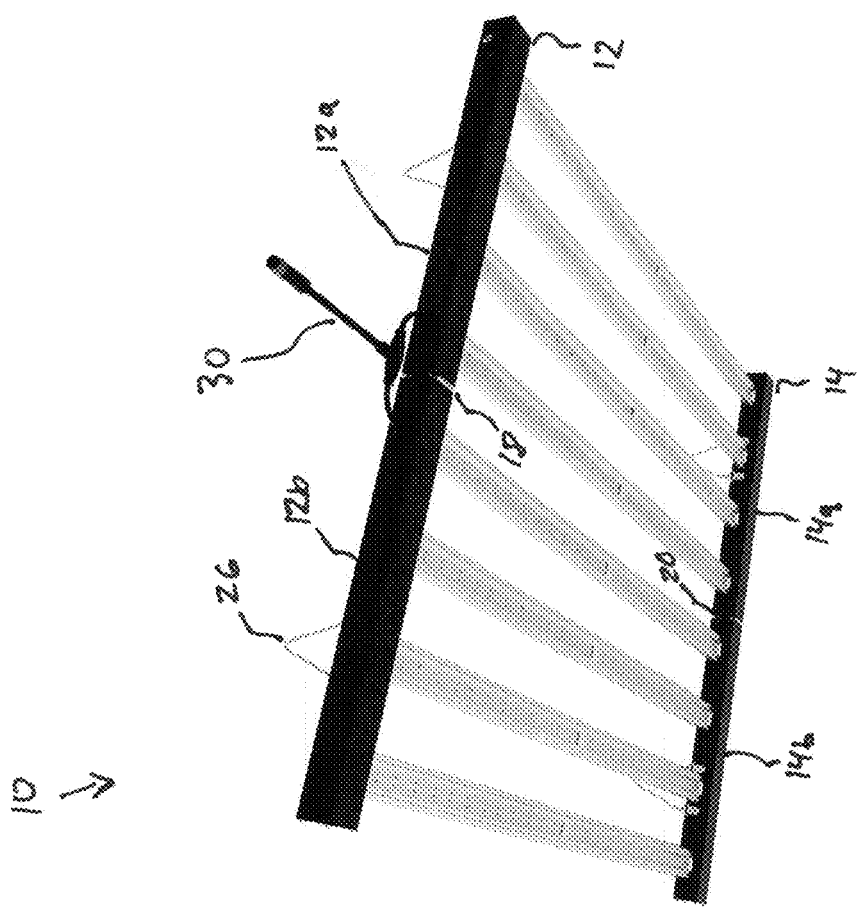

FIG. 1 illustrates a non-limiting exemplary embodiment of a light fixture 10 according to the present disclosure. The light fixture 10 includes a first support rail 12 and an oppositely arranged second support rail 14. A plurality of light bars 16 extend between the first and second support rails 12, 14. In one embodiment, the light fixture 10 includes six light bars 16 extending parallel to one another and perpendicularly to the first and second support rails 12, 14.

Each of the first and second support rails 12, 14 includes a first portion 12a, 14a and a second portion 12b, 14b. As shown in FIG. 1, the first portion 12a of the first support rail 12 is arranged colinear with the second portion 12b. Similarly, the first portion 14a of the second support rail 14 is arranged collinearly with the second portion 14b.

A first rotation element 18 is disposed on the first support rail 12 at an interface of first portion 12a and the second portion 12b. Similarly, a second rotation element 20 is disposed on the second support rail 14 at an interface of first portion 14a and the second portion 14b. The rotation elements 18, 20 are configured to allow the respective first portions 12a, 14a and/or the second portions 12b, 14b of the first and second support rails 12, 14 to rotate about an axis A-A (see, FIG. 3) which extends perpendicular to the support rails 12, 14. In one exemplary embodiment, the rotation elements 18, 20 are hinges. However, in alternate embodiments the rotation elements 18, 20 may be a flexible material piece or any device or element sufficient for enabling the described rotational movement of the support rails 12, 14.

The light fixture 10, as illustrated in FIGS. 1-5, includes a first side 22 and an opposite side 24 with the rotation elements 18, 20 disposed therebetween. The first side 22 is defined by the first portions 12a, 14a of the first and second support rails, respectively, and three of the six exemplary light bars 16. Correspondingly the second side 24 is defined by the second portions 12b, 14b of the first and second support rails, respectively, and the remaining three of the six exemplary light bars 16. The rotation elements 16, 18 essentially connect the first side 22 and the second side 24. The rotation elements further enable rotation of one or both of the first and second sides 22, 24 of the light fixture 10 about the axis A-A.

FIGS. 1-5 show the light fixture 10 in an extended position in which the first and second support rails 12, 14 extend linearly and are arranged parallel to one another. That is, the first and second portions 12a, 12b of the first support rail 12 are disposed collinear when the light fixture 10 is in the extended position. Similarly, the first and second portions 14a, 14b of the second support rail 14 are arranged in collinear fashion in the extended position. Further, the collinear arranged first and second portions 12a, 12b and 14a, 14b are disposed parallel to one another. The light fixture 10 is ready for use in the extended position, with all of the light bars 16 arranged to emit light in a common direction. The fixture 10 includes mounting elements 26 disposed on the first and second portions 12a, 12b, 14a, 14b and are configured to support the light fixture 10 when hanging from a ceiling or a mounting rack, for example. The mounting elements 26 may be any element sufficient for supporting the light fixture 10 and bearing the weight thereof when suspended from above. In the illustrated exemplary embodiment, the mounting elements 26 are metallic hooks.

FIGS. 6-10 show the light fixture 10 in a folded position in which the first portions 12a, 14a of the respective first and second support rails 12, 14 are in contact with and lie flat against the corresponding second portions 12b, 14b. That is, the first portions 12a, 14a of the first and second support rails 12, 14 are not collinear with the second portions 12b, 14b, but instead they are arranged parallel and non-collinear thereto. In the folded position, the light fixture 10 is arranged for storage or shipping. The footprint of the light fixture 10 in the folded position is 50% less than the footprint of the fixture 10 in the extended position. Because the first portions 12a, 14a reside upon the second portions 12b, 14b in the folded position, and because the various portions 12a, 12b, 14a, 14b have a slim profile, the overall height (H) of the light fixture 10 in the folded position is minimized. Thus, the reduced size of the light fixture 10 in the folded position is optimized for storage, shipping, and transport.

FIGS. 11-14 show underside and top views of the light fixture 10 in the extended position. FIGS. 15 and 16 illustrate the light fixture 10 transitioning from the extended position into the folded position. As shown, the second side 24 of the light fixture 10 rotates about the axis A-A one-hundred and eighty degrees from the extended position into the folded position in which the first portion 12a of the first support rail 12 lies upon the second portion 12b and, correspondingly, the first portion 14a of the second support rail 14 lies upon the second portion 14b.

As can be seen in FIG. 16, the rotation elements 18, 20, in this embodiment, comprise metallic hinges, each having a first half secured to the first portions 12a, 14a of the first and second support rails 12, 14 and a second half secured to the second portions 12b, 14b of the support rails 12, 14. The first and second halves of the hinges 18, 20 are rotatable relative to one another about a spine that extends collinear with the axis A-A so as to allow the pivotal movement of the first and second sides 22, 24 of the light fixture 10 described herein.

Figure 17:
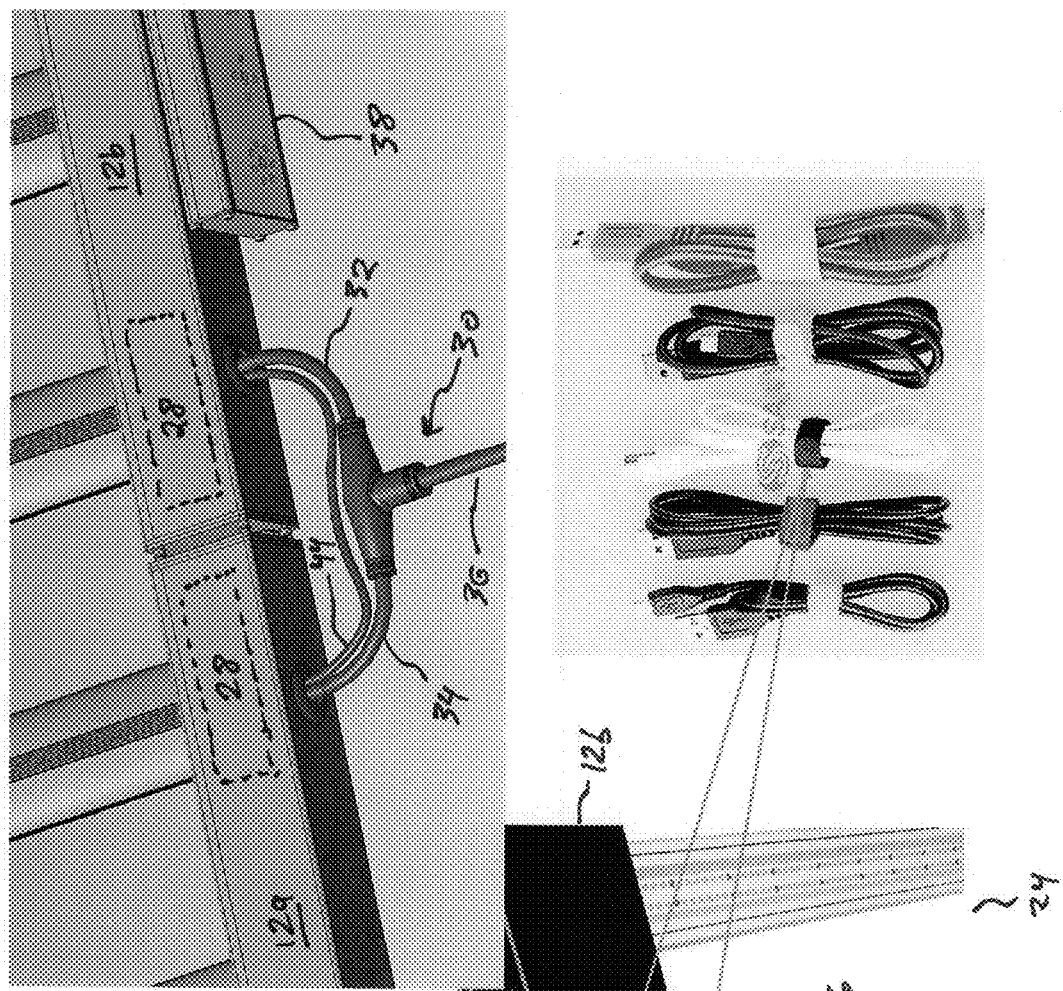
FIGS. 17-18 show enlarged partial views of the light fixture.

The light fixture 10 further includes a power driver 28 disposed in at least one of the first and second portions 12a, 12b of the support rail 12. In the illustrated example, the power driver 28 is disposed at an interior of both of the first and second portions 12a, 12b of the first support rail 12. See, schematic representation in FIG. 17. The power driver 28 disposed in the first portion 12a is electrically connected to the light bars 16 disposed in the first side 22 of the light fixture 10 by direct wiring 29 (see FIG. 19) and is configured to deliver power thereto in order to illuminate the light bars 16. Similarly, the power driver 28 disposed in the second portion 12b is electrically connected to the light bars 16 disposed in the second side 24 of the light fixture 10 by similar wiring and is configured to deliver power thereto in order to illuminate the light bars 16.

Because the power drivers 28 are disposed within the interior of the first and second portions 12a, 12b of the first support rail 12, the drivers 28 do not interfere with nor obstruct the light fixture 10 when maneuvering from the extended position into the folded position. The drivers 28 are internally mounted and thus do not increase the overall size of the light fixture 10. Also, because the internally mounted power drivers 28 have a slim profile, they do not increase the height H of the light fixture. This slim profile is also advantageous when mounting the light fixture 10 in an indoor setting. Particularly, the reduced profile and internal drivers 28 enable the light fixture 10 to be mounted relatively closer to a ceiling or other overhead mounting arrangement. An external power driver does not need to be accommodated nor is additional racking or mounting equipment necessary for affixing such an external driver. Additionally, the vertical space is increased between the light fixture 10 and the plants growing beneath, thus increasing plant size and yield. Furthermore, the slim profile of the light fixture 10 allows for additional tiers of the light fixture 10 to be arranged in a vertical rack setting, thus increasing production per square foot.

Figure 18:
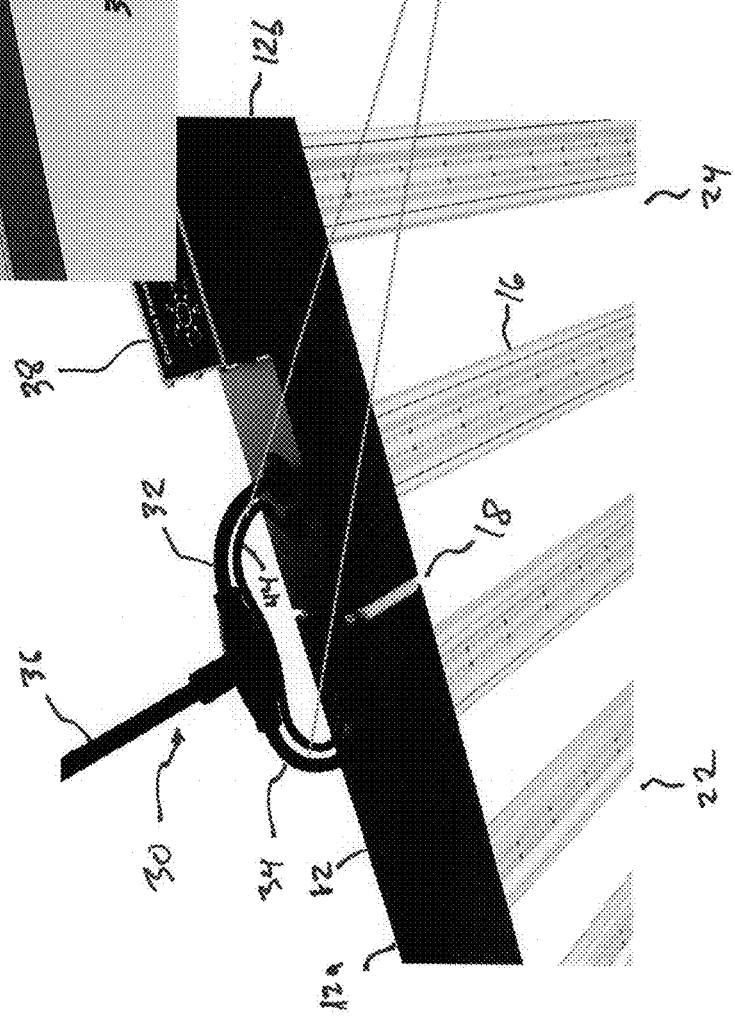
Figure 14:
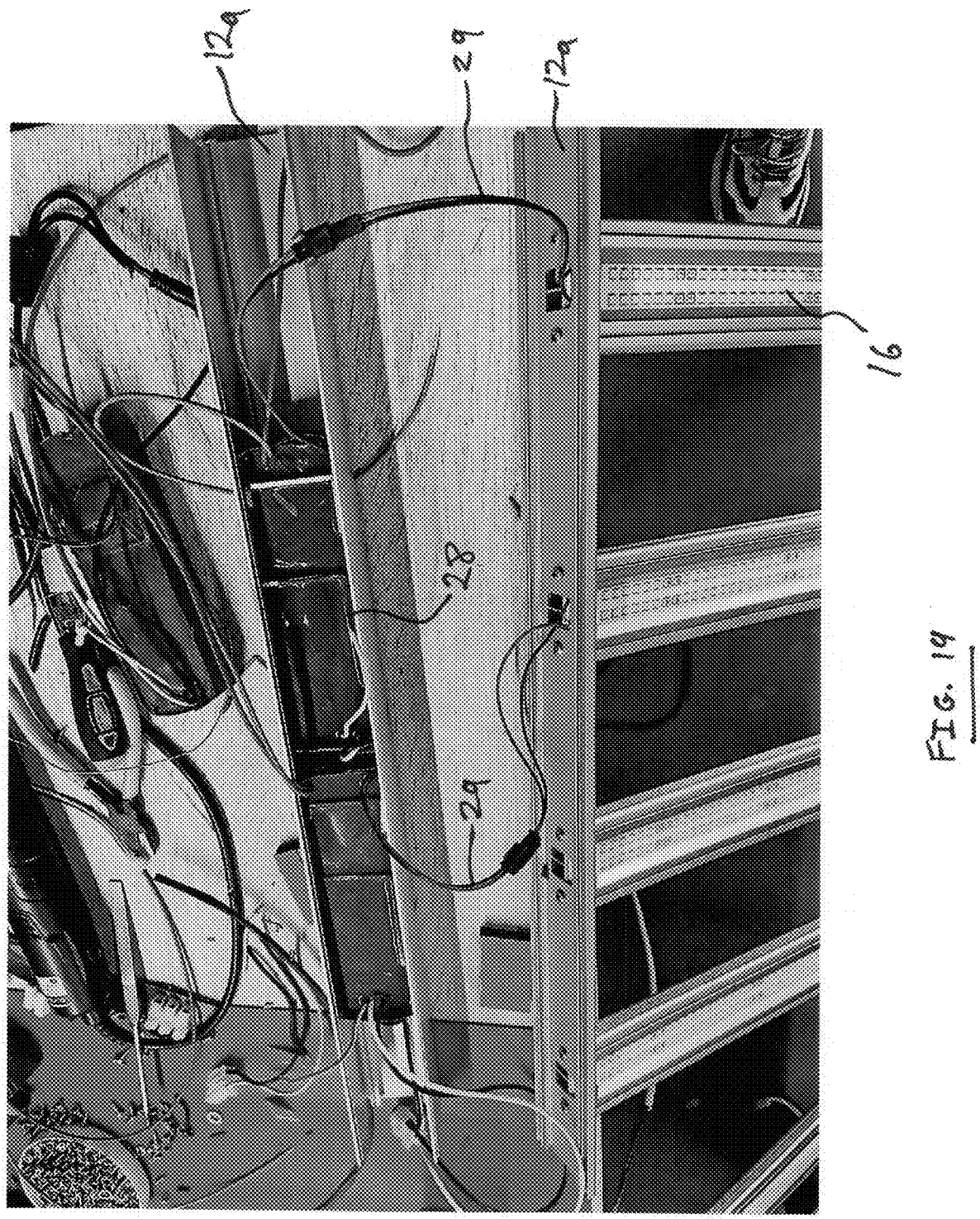

The light fixture 10 also includes an external connector 30 disposed outside of a body of the fixture 10. See, for example, FIGS. 17-18. A first end 32 of the external connector extends within the second portion 12b of the first support rail 12 and connects therein with the power driver 28. A second end 34 of the external connector 30 extends within the first portion 12a of the first support rail 12 and connects therein with the power driver 28. The external connector 30 further includes a power cord 36 which extends from the light fixture 10 to a power source (not shown). The power cord 36 is connected to the power source such that electrical power may be delivered from the source to the power drivers 28 and then distributed, as discussed above, to the light bars 16.

The light fixture 10 further includes a control panel 38 disposed on an exterior of the second portion 12b of the first support rail 12. See, for example, FIGS. 17, 18, 20. The control panel 38 includes a user interface by which a user may interact with an control the light fixture 10. In the illustrated example, the control panel 38 includes a power switch 38a, a timer 38b, and a dimmer 38c. The power switch 38a allows the user to deliver power to the light bars 16 and thus turn the light fixture 10 on and off. The timer 38b allows the user to set a time for the light fixture to turn on or off. The dimmer 38c allows the user to control the intensity of the light emitted by the light bars 16. The control panel 38 is arranged in electrical communication with on or both of the power drivers 28. The various switches and controls 38a-c of the control panel 38 may be mechanical switches, dials, or the like, and/or touch sensitive elements or the like. The various switches and controls 38a-c of the control panel 38 are described by way of example, the control panel 38 may include fewer, more, and/or different controls, as desired.

The light fixture 10 also includes a dimming control 40 disposed on the second portion 12b of the first support rail 12. See, FIGS. 20-21. The dimming knob 40 is configured to allow the user a further location for adjusting the luminance intensity of the light emitted from the light bars. In the illustrated embodiment, the dimming control 40 is illustrated is a rotatable knob. In other exemplary embodiments, the dimming control 40 may be any desired mechanical switch, dial, lever, sliding element, touch sensitive element, etc. The dimming control 40 is arranged in electrical communication with the control panel 38 by a cable 42.

As discussed, the control panel 38 is directly connected to the power driver 28 disposed in the second portion 12b of the support rail 12 by wiring. The control panel 38 is further arranged in electronic communication with the power driver 28 disposed in the first portion 12a of the support rail 12 by a cable connection 44. See, for example, FIGS. 17-18. The dimming control 40 is likewise disposed communicatively with the power driver 28 of the first portion 12a of the support rail 12 by way of the cable 42, the control panel 38, and the cable connection 44. This arrangement allows the user to control both power drivers 28 and all of the light bars 16 on both sides 22, 24 of the light fixture 10 by toggling the control panel 38 and the dimmer control 40.

FIGS. 21-24 show various enlarged partial views of the light fixture 10. As can be seen therein, stops 46 are provided on ends of the support rails 12 and 14. In the illustrated exemplary embodiment, each end of the support rails 12 and 14 include four stops 16 disposed at an outer perimeter of the ends and, more specifically, at corners of the square profile of the ends. The stops 46 are positioned similarly on each of the ends of the support rails 12, 14 such that the stops 46 on the first portions 12a, 14a engage and contact the stops 46 on the second portions 12b, 14b when the light fixture 10 is in the extended position as can be seen, for example in FIG. 22. This ensures that the first and second portions 12a, 12b and 14a, 14b of the support rails 12, 14 engage each other squarely in the extended position such that the first and second portions 12a, 12b, 14a, 14b are collinear despite the interposition of the rotation element 18 between the opposing portions. The stops 46 also protect the ends of the support rails against wear and damage during engagement in the extended position and when multiple light fixtures 10 are arranged in tandem.

The rotation elements 18 and 20 are disposed proximate to a bottom side of the light fixture 20 as can be seen, for example, in FIGS. 15, 16, 18, 22, and 24. That is, in the illustrated embodiment, the hinges 18, 20 are disposed proximate to the side of the light fixture 10 where light is emitted from the light bars 16. As such, when the light fixture 10 is suspended from above in the extended position during use, the hinges 18, 20 are subject to a tensile force whereas the stops 46 positioned opposite from the hinges 18, 20 are subject to a counterbalancing compression force. The result is that the light fixture 10 is maintained in a planar position without requiring further securement of the first and second sides 22, 24.

The elements discussed herein are exemplary in nature, variations and alternatives form a part of the broad scope of the disclosure.

The light fixture 10 has been described as included six light bars 16, three in the first side 22 of the fixture 10 and three in the second side 24, as illustrated for example in FIGS. 1-5. Alternatively, each side 22, 24 of the fixture 10 may include four light bars, as illustrated in FIGS. 6-10, 11, 13, 15, and 16. Each side 22, 24 of the light fixture 10 may include more or less of such light bars 16. For example, each side 22, 24 may include 5, 6, 7, or 8 light bars. The sides 22, 24 may further include the same or a different number of the light bars 16.

Communications between the control panel 38, the dimmer control 40, and the power drivers 28 may be provide wirelessly rather than by the hardwired cables described above.

The stops 46 are illustrated herein as metallic cylindrical elements positioned at the corners of the square ends of the support rails 12, 14. The stops 46 may however assume any shape and be formed of any material sufficient to withstand the compression force when the light fixture is in the extended position, as described above, and to protect the ends of the support rails 12, 14 during use of the fixture 10, as also described above. The support rails 12, 14 of course may take any desirable cross-sectional shape such as square, as illustrated, or rectangular, circular, oval triangular, irregular, or any combination and/or modification hereof. Moreover, the support rails 12, 14 may be have a consistent cross-section over their length, as illustrated, or the cross-sectional shape thereof may vary across their length.

Herein, two power drivers 28 are described as being disposed in the support rail 12, one in the first portion 12a and the other in the second portion 12b. Alternatively, the light fixture 10 may include a single power driver 28 disposed in one of the first and second portions 12a, 12b. Such a single power driver 28 disposed, for example, in the first portion 12a of the support rail 12 would be connected to the light bars 16 in the first side 22 of the fixture 10 by way of the wiring 29 as discussed above. This single driver 28 would further be connected to the light bars 16 in the second side 24 of the fixture 10 by one or more cables extending as part of or with the cable connection 44 from the first portion 12a to the second portion 12b of the support rail 12.

The external connector 30 and the cable connection 44 are shaped, dimensioned, and arranged not to interfere with the light fixture 10 as is it is maneuvered between the folded and extended positions. In the illustrated embodiment, the external connector 30 and the cable connection 44 comprise a U-shape which assists in maintaining their position outside of a footprint of the light fixture 10. This way, when the fixture 10 is moved from the extended position to the folded position, the external connector 30 and the cable connection 44 are not caught between the first and second portions 12a, 12b of the support rail 12 where they would otherwise engage the first and second portions 12a, 12b and likely prevent full rotation thereof about the axis A-A.

Various embodiments of the present invention are described herein with reference to the related drawings. Alternative embodiments can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. Terms such as "connected to", "affixed to", etc., can include both an indirect "connection" and a direct "connection."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A light fixture for indoor growing of horticulture products, comprising:
   a first support rail;
   a second support rail arranged opposite from the first support rail;
   a plurality of light bars extending between the first and second support rails;
   a first rotation element disposed in the first support rail about which at least one of a first portion and a second portion of the first support rail is rotatable;
   a second rotation element disposed in the second support rail about which at least one of a first portion and a second portion of the second support rail is rotatable;
   a power driver disposed at an interior of at least one of the first or second portions of the first or second support rails;
   wherein the first and second rotation elements are arranged generally opposite from one another;
   wherein the first and second rotation elements delimit a first side of the light fixture comprising the first portion of the first support rail, the first portion of the second support rail, and the light bars extending therebetween;
   wherein the first and second rotation elements further delimit a second side of the light fixture comprising the second portion of the first support rail, the second portion of the second support rail, and the light bars extending therebetween;
   wherein at least one of the first and second sides of the light fixture is rotatable about the first and second rotation elements to place the light fixture in a folded position where the first portions of the first and second support rails are adjacent to and parallel with the second portions of the first and second support rails, and an extended position where the first portions of the first and second support rails are colinear with the second portions of the first and second support rails;
   wherein the power driver is disposed in the first portion of the first support rail, the light fixture further comprising a control panel disposed on the first portion, the control panel being communicative with the power driver to enable a user to operate the light fixture;
   wherein the power driver is connected to the light bars in the first side of the light fixture to deliver power to the light bars when instructed by the control panel; and
   wherein the light fixture further comprises:
   a second power driver disposed at an interior of the second portion of the first support rail and connected to the light bars in the second side of the light fixture to deliver power to the light bars when instructed by the control panel; and
   an external connector which extends from the power driver in the first portion of the first support rail to the power driver in the second portion, wherein the external connector further extends from the light fixture to an external power source which provides power to the light fixture.

2. The light fixture of claim 1, wherein the first and second rotation elements are hinges.

3. The light fixture of claim 1, wherein the first portions of the first and second support rails contact and lie flat against the second portions of the first and second support rails when the light fixture is in the folded position.

4. The light fixture of claim 1, wherein the at least one first and second sides of the light fixture is rotatable about the rotation means one-hundred and eighty degrees between the folded position and the extended position.

5. The light fixture of claim 4, wherein the rotational element prevents the first and second sides from rotating more than one-hundred and eighty degrees in the extended position.

6. The light fixture of claim 1, further comprising an external connector which extends from the power driver to the second portion of the first rail and is connected to the light bars of the second side of the light fixture to deliver power to the light bars when instructed by the control panel.

7. The light fixture of claim 6, wherein the external connector further extends from the light fixture to an external power source which provides power to the light fixture.

8. The light fixture of claim 1, wherein the control panel is configured to allow the user to turn the light bars on and off, to adjust the intensity of the light emitted by the light bars, and to program a time at which the light bars turn on and off.

9. The light fixture of claim 1, further comprising a mounting element configured to support the light fixture during use.

10. The light fixture of claim 9, wherein the mounting element comprising at least one mounting hook disposed on each of the first and second portions of the first and second support rails.

11. The light fixture of claim 1, further comprising a stop element disposed at opposing ends of the first and second portions of the first and second support rails.

12. The light fixture of claim 11, wherein:
   the stop element disposed at the end of the first portion of the first support rail proximate to the first rotational element is arranged to contact and abut the stop element at the end of the second portion of the first support rail proximate to the first rotational element when the light fixture is in the extended position; and
   the stop element disposed at the end of the first portion of the second support rail proximate to the second rotational element is arranged to contact and abut the stop element at the end of the second portion of the first support rail proximate to the second rotational element when the light fixture is in the extended position.

13. The light fixture of claim 12, wherein the ends of the first and second portions of the first and second support rails are square shaped and wherein each stop element comprises four cylindrically shaped members positioned at corners of the square shaped ends.

14. The light fixture of claim 3, wherein the first and second rotational elements are centrally disposed on the first and second support rails, respectively.

15. The light fixture of claim 14, wherein the light fixture has a length in the folded position that is half of a length of the light fixture in the extended position.

\* \* \* \* \*